(12) United States Patent
Caroli (10) Patent No.: US 11,163,808 B2
(45) Date of Patent: Nov. 2, 2021

(54) HEXAGON CLUSTERING OF SPATIAL DATA

(71) Applicant: SAP SE, Walldorf (DE)

(72) Inventor: Manuel Caroli, Walldorf (DE)

(73) Assignee: SAP SE, Walldorf (DE)

( * ) Notice: Subject to any disclaimer, the term of this patent is extended or adjusted under 35 U.S.C. 154(b) by 243 days.

(21) Appl. No.: 16/374,142

(22) Filed: Apr. 3, 2019

(65) Prior Publication Data

US 2020/0320108 A1    Oct. 8, 2020

(51) Int. Cl.
*G06F 7/00* (2006.01)
*G06F 16/29* (2019.01)
*G06T 15/10* (2011.01)
*G06T 17/05* (2011.01)

(52) U.S. Cl.
CPC .............. *G06F 16/29* (2019.01); *G06T 15/10* (2013.01); *G06T 17/05* (2013.01)

(58) Field of Classification Search
CPC ...... G06F 16/29; G06F 16/387; G06F 16/487; G06F 16/587; G06F 16/687; G06F 16/787; G06F 16/909; G06T 15/10; G06T 17/05; G06T 11/206
See application file for complete search history.

(56) References Cited

U.S. PATENT DOCUMENTS

| | | | | |
|---|---|---|---|---|
| 4,896,029 A | * | 1/1990 | Chandler | G06K 7/1093 235/487 |
| 5,578,840 A | * | 11/1996 | Scepanovic | G06F 30/392 257/207 |
| 6,094,509 A | * | 7/2000 | Zheng | G06K 7/1093 382/218 |
| 6,420,698 B1 | * | 7/2002 | Dimsdale | G01S 7/4811 250/205 |
| 2004/0117358 A1 | * | 6/2004 | von Kaenel | G06Q 40/08 |
| 2005/0035964 A1 | * | 2/2005 | Heenan | G06T 17/20 345/420 |
| 2005/0193365 A1 | * | 9/2005 | Sahr | G01C 21/20 717/100 |
| 2006/0265197 A1 | * | 11/2006 | Peterson | G06T 9/40 703/2 |
| 2008/0036758 A1 | * | 2/2008 | Carpenter | G06T 7/70 345/419 |
| 2009/0005968 A1 | * | 1/2009 | Vengroff | G06F 16/9537 701/425 |
| 2012/0206494 A1 | * | 8/2012 | Sahr | G06F 16/2264 345/660 |
| 2014/0156223 A1 | * | 6/2014 | Toomre | G06K 9/0014 702/179 |

(Continued)

*Primary Examiner* — Mohammed R Uddin
(74) *Attorney, Agent, or Firm* — Mintz Levin Cohn Ferris Glovsky and Popeo, P.C.

(57) ABSTRACT

Described herein are systems and method for mapping data points in a spatial data set. In some embodiments, a hexagon grid can be defined for mapping a plurality of data points in a spatial data set. Location information can be specified for each hexagon in the hexagon grid. The specifying can include calculating, for each hexagon, a first location of a first vertex and a second location of a second vertex. A rectangular grid including a plurality of rectangular cells can be mapped to the hexagon grid. A location of a data point of the plurality of data points can be determined relative to a first hexagon of the hexagon grid.

14 Claims, 6 Drawing Sheets

(56) References Cited

U.S. PATENT DOCUMENTS

| | | | |
|---|---|---|---|
| 2016/0223647 A1* | 8/2016 | Nichols | G01S 13/426 |
| 2017/0011089 A1* | 1/2017 | Bermudez Rodriguez | G06F 16/24532 |
| 2019/0277974 A1* | 9/2019 | Sahr | G01C 21/20 |
| 2019/0360818 A1* | 11/2019 | Linder | G06F 16/909 |
| 2020/0201869 A1* | 6/2020 | Mihic | G06F 16/29 |
| 2020/0249028 A1* | 8/2020 | Fridin | G01C 21/32 |

* cited by examiner

SAP HANA Spatial hexagonal grid clustering can be configured using one of the three following clauses (square brackets denote optional subclauses):

- X [ BETWEEN <left-point> AND <right-point> ] CELLS <int> [ Y BETWEEN <lower-point> AND <upper-point> ]
- [ X BETWEEN <left-point> AND <right-point> ] Y [ BETWEEN <lower-point> AND <upper-point> ] CELLS <int>
- CELL AREA <double> [ <uom> ] [ ALIGNMENT <alignment> ] [ X BETWEEN <left-point> AND <right-point> ] [ Y BETWEEN <lower-point> AND <upper-point> ]

<uom> is expected to be a string literal describing a valid unit of measure. <alignment> is expected to be one of HORIZONTAL or VERTICAL:

- HORIZONTAL
  The hexagons are arranged row-wise, that is, the tips are pointing upwards and downwards.
- VERTICAL If the <alignment> clause is omitted, it defaults to HORIZONTAL. If the hexagonal grid clustering is specified by The hexagons are arranged column-wise, that is, the tips are pointing to the right and to the left. X CELLS, the alignment is HORIZONTAL; if it is specified by Y CELLS, the alignment is VERTICAL.

HEXAGON CLUSTERING OF SPATIAL DATA

TECHNICAL FIELD

The current subject matter is directed to clustering spatial data using a hexagonal grid.

BACKGROUND

Geographic information systems (GIS), sometimes referred to as spatial information systems (SIS), are specialized information systems that may be used for capture, modeling, storage, retrieval, sharing, manipulation, analysis and/or presentation of spatial data. For example, the spatial data may include both geometry (location, shape etc.) and topology (spatial relationships such as adjacency). The special traits of a geometric object may differ significantly from any standard type, such as integers and strings.

SUMMARY

Systems, methods, and articles of manufacture, including computer program products, are provided for reclaiming memory resources. In one aspect, there is provided a system. The system may include at least one data processor and at least one memory. The at least one memory may store instructions that result in operations when executed by the at least one data processor. The operations may include: defining a hexagon grid for mapping a plurality of data points in a spatial data set; specifying location information for each hexagon in the hexagon grid, the specifying comprising calculating, for each hexagon, a first location of a first vertex and a second location of a second vertex; mapping a rectangular grid comprising a plurality of rectangular cells to the hexagon grid; and determining a location of a data point of the plurality of data points relative to a first hexagon of the hexagon grid.

In some variations, one or more features disclosed herein including the following features may optionally be included in any feasible combination. Determining the location of the data point relative to the first hexagon may include comparing a position of the data point relative to a first rectangular cell of the plurality of rectangular cells. The first rectangular cell may surround the data point and include a line extending between the first vertex and the second vertex of the first rectangular cell In some variations, determining the location of the data point relative to the first hexagon may include determining the data point is positioned at one of two first vertices of the first hexagon. The first vertices may map the data point as being included in the first hexagon.

In some variations, determining the location of the data point relative to the first hexagon may include determining the data point is positioned at one of four second vertices of the first hexagon. The second vertices may map the data point as being outside of the first hexagon.

In some variations, determining the location of the data point relative to the first hexagon may include determining the data point is positioned along one of three first sides of the first hexagon. The first sides may map the data point as being included in the first hexagon.

In some variations, determining the location of the data point relative to the first hexagon may include determining the data point is positioned along one of three second sides of the first hexagon. The second sides may map the data point as being outside of the first hexagon In some variations, the operations executed by the at least one data processor may further include the following: calculating the first location of the first vertex and the second location of the second vertex for the selected hexagon based on information for the selected hexagon; and calculating locations of the remaining vertices of the selected hexagon based on information for at least one neighboring hexagon that is adjacent to the selected hexagon, the neighboring hexagon sharing one of the remaining vertices of the selected hexagon.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to sharing access to data from a cloud-based analytics engine, it should be readily understood that such features are not intended to be limiting. The claims that follow this disclosure are intended to define the scope of the protected subject matter Non-transitory computer program products are also described that store instructions, which when executed, cause one or more data processors across one or more computing systems to implement various operations described herein. Similarly, computer systems are also described that may include at least one data processor and a memory coupled to the at least one data processor. The memory may temporarily or permanently store one or more programs that cause the at least one data processor to perform one or more of the operations described herein. In addition, operations specified by methods can be implemented by one or more data processors either within a single computing system or distributed among two or more computing systems.

The details of one or more variations of the subject matter described herein are set forth in the accompanying drawings and the description below. Features and advantages of the subject matter described herein will be apparent from the description and drawings, and from the claims.

DESCRIPTION OF DRAWINGS

FIG. 4 illustrates an example programming code corresponding to hexagonal grid clustering consistent with the subject matter disclosed herein;

When practical, similar reference numbers denote similar structures, features, or elements.

DETAILED DESCRIPTION

Clustering can include the categorization of objects into different groups, or more precisely, the organizing of a collection of patterns (usually represented as a vector of measurements, or a point in a multidimensional space) into clusters based on similarity. A cluster is a collection of objects that are "similar" between them and "dissimilar" to the objects belonging to other clusters. The goal of clustering is to determine an intrinsic grouping, or structure, in a set of unlabeled data. Clustering can be used to perform statistical data analysis in many fields, including machine learning, data mining, document retrieval, pattern recognition, medical imaging and other image analysis, and bioinformatics.

Described herein are various systems and methods for clustering spatial data using a hexagonal grid. For example, the hexagonal grid can include a plurality of hexagonal cells that are formed in relation to and within a defined bounding box and/or data points of a spatial data set. At least one advantage of the hexagonal grid clustering includes an efficient and effective way to provide visually appealing data clustering results and include low perimeter-to-area ratios (such as due to the shape of the hexagonal cells). Furthermore, each hexagonal cell can include a single type of neighbor (e.g., a hexagon cell), as opposed to other types of grids, such as rectangular grids that include at least two neighbors (e.g., neighbors sharing an edge and neighbors along diagonals).

Figure 1:
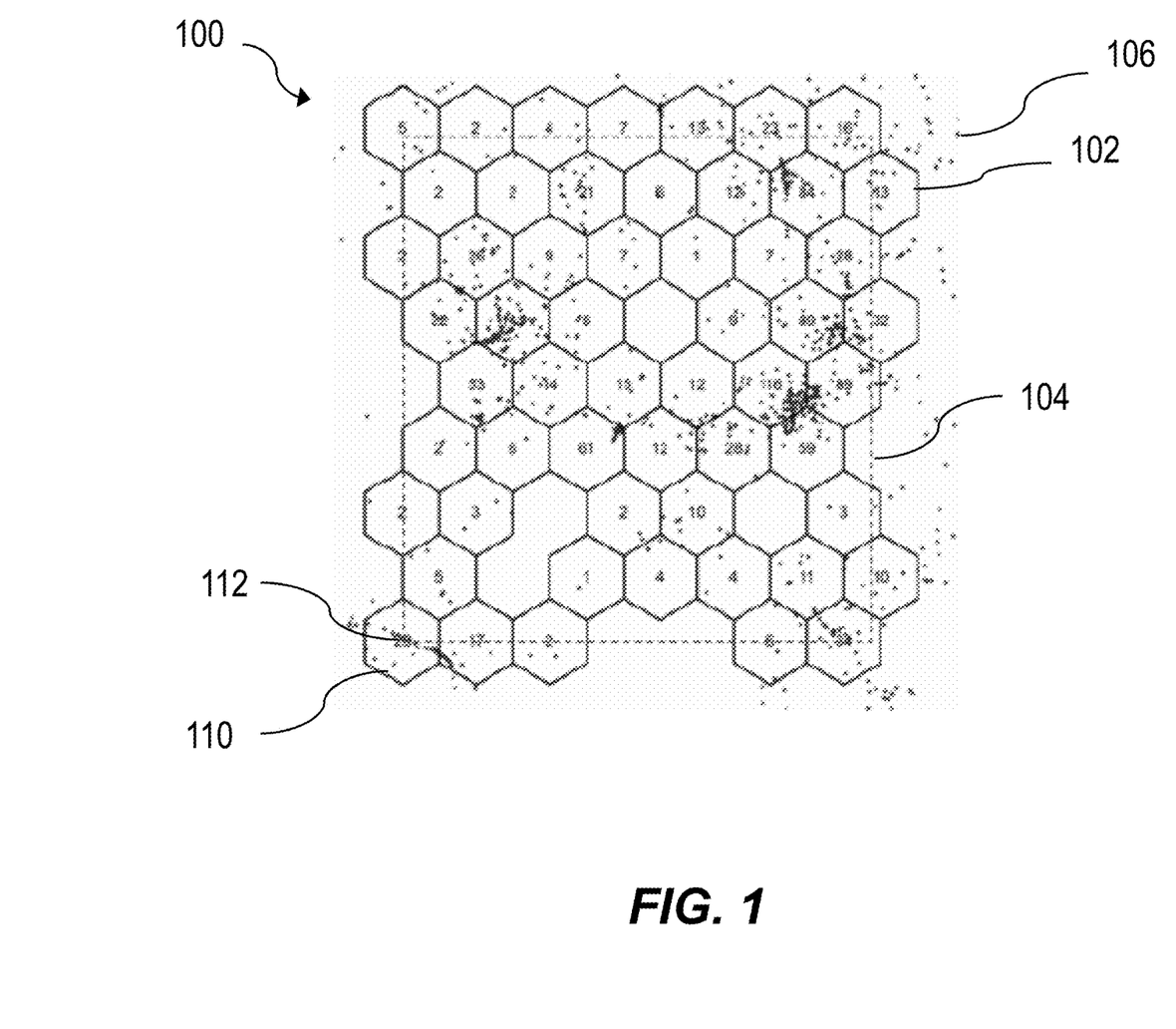
FIG. 1 illustrates an embodiment of a hexagonal grid including a plurality of hexagonal cells formed in relation to and within an area indicated by a bounding box.

FIG. 1 illustrates an embodiment of a hexagonal grid 100 including a plurality of hexagonal cells 102 formed in relation to and within an area indicated by a bounding box 104. As shown in FIG. 1, each hexagonal cell 102 can include a regular hexagonal shape, which can include a perimeter having six edges or sides with equal lengths. Each edge or side can extend between two vertices or points. Each hexagonal cell 102 can surround at least one data point 106 positioned adjacent to and/or within the bounding box 104.

As shown in FIG. 1, the hexagonal cells 102 of the hexagonal grid 100 can each be sized the same. Additionally, the number and size of each of the hexagonal cells 102 can be defined and/or adjusted by specifying either a number of hexagonal cells 102 to extend along the bounding box 104 in an X-direction or a number of hexagonal cells 102 to extend along the bounding box 104 in a Y-direction. In some implementations, the number and size of the hexagonal cells 102 within the bounding box 104 can be defined and/or adjusted by defining an area of each of the hexagonal cells 102. For example, since each of the hexagonal cells 102 are sized the same and have a regular hexagonal shape, the hexagonal cells 102 can be defined and/or adjusted by setting one of the above mentioned characteristics (e.g., number of hexagonal cells 102 along the X-direction or Y-direction of the bounding box 104, or the area of each of the hexagonal cells 102).

In some implementations, a bounding box 104 can be defined and the hexagonal grid 100 can fill or substantially fill the bounding box 104. For example, a first hexagonal cell 110 can be centered in a lower left vertex of the bounding box 104 such that a center point 112 of the first hexagonal cell 110 intersects the lower left vertex of the bounding box 104. As such, a part of the first hexagonal cell 110 can extend outside of the bounding box 104. From this first hexagonal cell 110, additional hexagonal cells 102 can be aligned relative to the first hexagonal cell 110 and/or the bounding box 104, such as along the X-direction (rows) and Y-direction (columns). As such, some of hexagonal cells 102 can partially extend outside of the bounding box 104, such as hexagonal cells aligned vertically and/or horizontally with the first hexagonal cell 110, as shown in FIG. 1. As a result, some data points 106 positioned outside of the bounding box 104 may still be positioned within a hexagonal cell 102. Such data points 106 can be assigned to the respective hexagonal cell and not considered positioned outside of the hexagonal cell and/or the bounding box 104. However, data points 106 that are not located within a perimeter of a hexagonal cell can be considered outside of the hexagonal cell and can be assigned to a different cluster.

In some implementations, a bounding box 104 is not specified and a hexagonal grid 100 is generated such that all data points of a data set lie within the hexagonal grid 100. As such, each data point of the data set can be assigned to a hexagonal cell 102 of the hexagonal grid 100.

In some implementations, the configuration of the hexagonal grid 100, such as the layout of the hexagonal cells 102, can be defined by a user if the hexagonal cell size is specified by the area of each hexagonal cell. In contrast, if the number of hexagonal cells 102 in an X-direction or Y-direction of the bounding box 104 is defined, the alignment of the hexagonal cells 102 may be set automatically by the system and unable to be modified by a user.

Figures 2A, 2B:
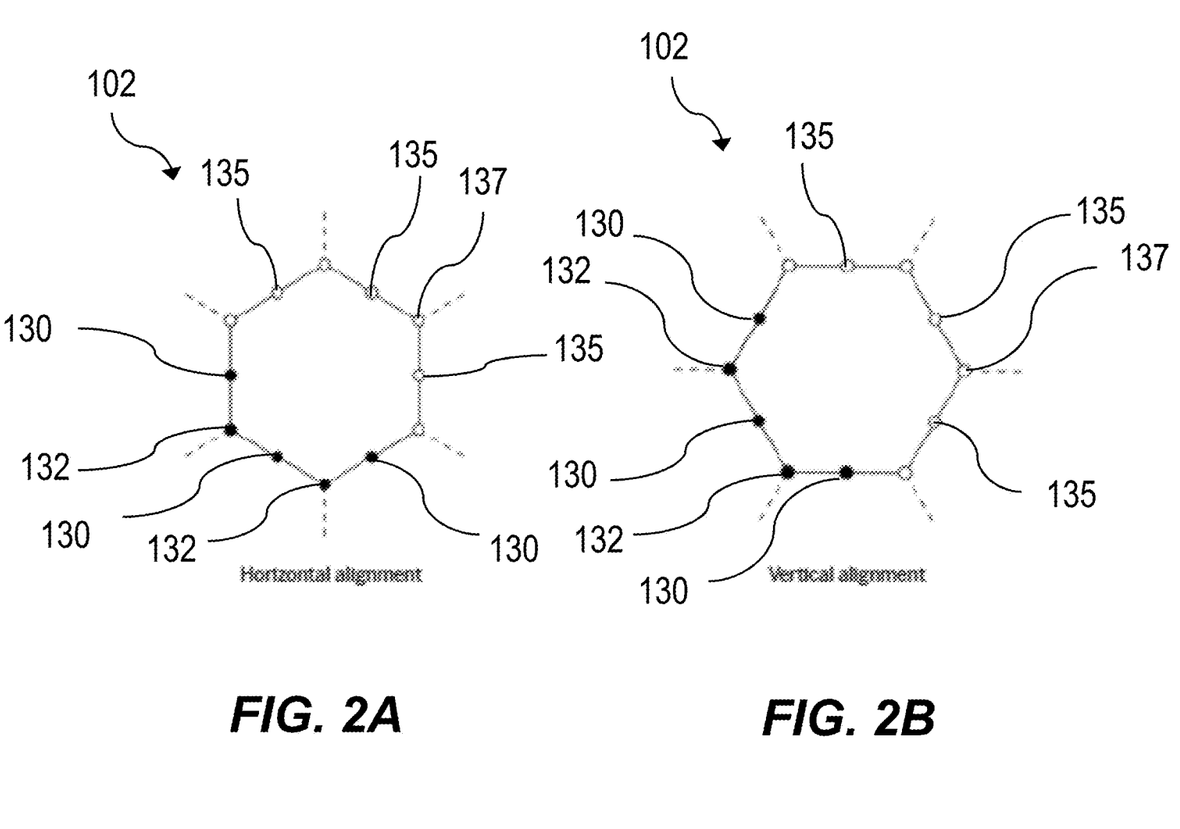
FIGS. 2A and 2B illustrate a hexagonal cell oriented in a horizontal alignment and a vertical alignment, respectively.

FIGS. 2A and 2B illustrate a hexagonal cell 102 oriented in a horizontal alignment and a vertical alignment, respectively. In some implementations, the hexagonal cells 102 are arranged column-wise, however, other arrangements of the hexagonal cells 102 are within the scope of this disclosure. Data points 106 positioned inside the perimeter of the hexagonal cell 102 are assigned to that hexagonal cell 102. However, a data point 106 positioned on a perimeter of the hexagonal cell 102 can be considered to be inside the hexagonal cell 102 if positioned along one of the lower left sides or edges 130 of the perimeter of the hexagonal cell 102. Additionally, a data point positioned along one of the upper right sides 135 of the perimeter can be considered to be outside of the hexagonal cell 102. Furthermore, a data point positioned on a lower left vertex 132 of the hexagonal cell can be considered to be inside the hexagonal cell 102 and a data point 106 positioned on any of the remaining, upper right vertices 137 of the hexagonal cell can be considered to be outside of the hexagonal cell 102.

Various embodiments for determining whether a data point 106 lies within a hexagonal cell 102 is within the scope of this disclosure. For example, any two adjacent vertices, including any of the upper right vertices 137, can be designated as vertices that assign data points laying thereon as laying within the hexagonal cell 102. Furthermore, any three adjacent sides, including any of the upper right sides 135, can be designated as sides that assign data points laying along such sides as laying within the hexagonal cell 102.

In some implementations, each hexagonal cell 102 can be designated a unique identifier, such as a number. For example, the first hexagonal cell 110 can be designated with a first identifier, such as the number one, and hexagonal cell identifier numbers can increase from left-to-right and bottom-to-top of the bounding box 104. In some implementations, each hexagonal cell 102 can be associated with a data number, which can indicate how many data points are located within the respective hexagonal cell 102, such has shown by way of example in FIG. 1.

In some embodiments, all vertices for a selected hexagon in the hexagon grid can be determined. Such determining of all the vertices can include calculating the location of a first vertex of the selected hexagon and calculating a location of a second vertex of the selected hexagon. Calculating the vertices of the selected hexagon can be based on information related to the selected hexagon, such as one or more of the following characteristics of the selected hexagon: area, center point, distance between center point and a vertex, side length, etc. Furthermore, the determining of all the vertices can also include calculating locations of the remaining vertices of the selected hexagon based on information (e.g., area, center point, etc.) for at least one neighboring hexagon that is adjacent to the selected hexagon. For example, the neighboring hexagon can share one of the remaining vertices of the selected hexagon.

In some embodiments, the data points 106 can be represented by the Institute of Electrical and Electronics Engineers (IEEE) 754 standard for floating point arithmetic. For example, given a data point with coordinates x and y can allow the system to identify the hexagonal cell 102 in which the data point is positioned within.

For example, the hexagonal grid 100 can be used with SAP HANA (available from SAP SE of Walldorf, Germany) data mapping and clustering programs.

In some implementations, the bounding box 104 can be defined by a lower left point (lx, ly) and an upper right point (rx, uy). For example, the bounding box 104 can be defined using a variety of characteristics, including a height (H) and a width (W) of the bounding box.

Figure 3:
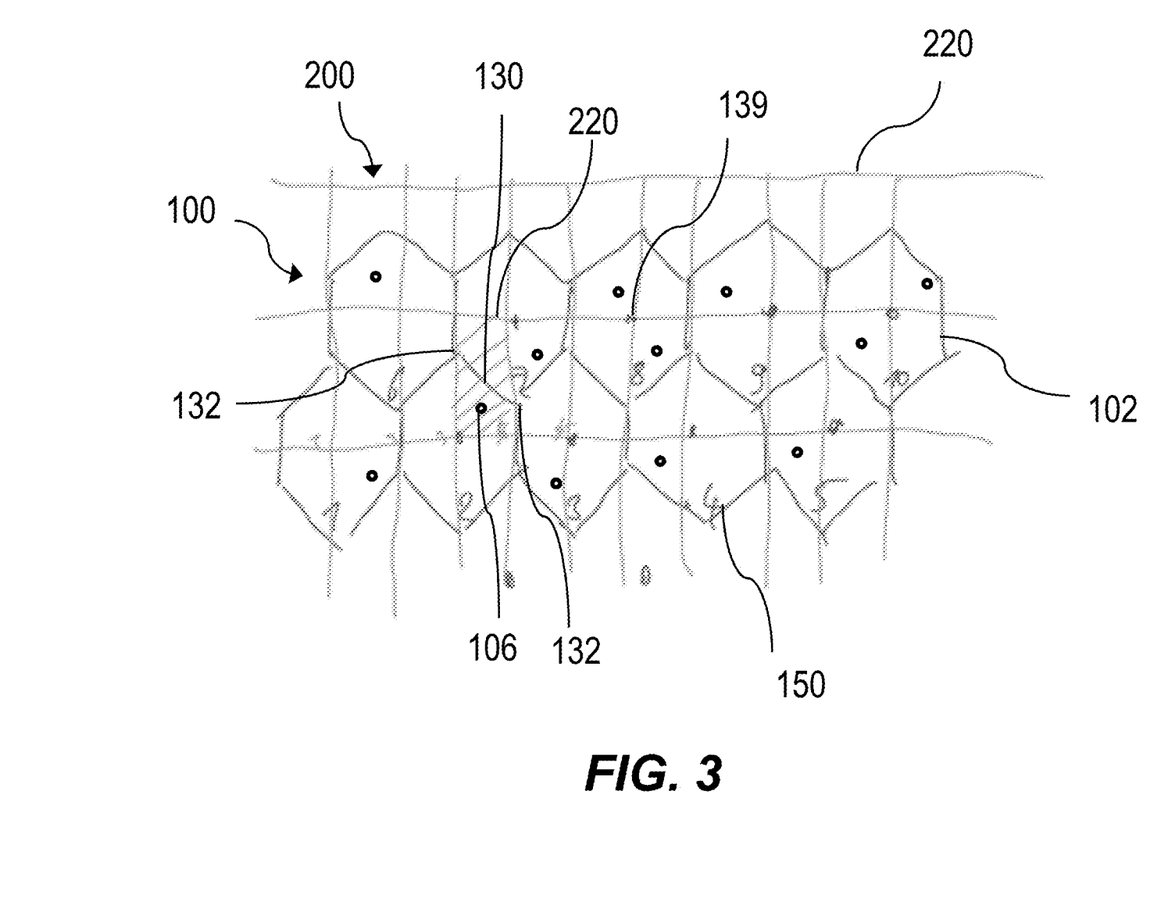
FIG. 3 illustrates an example of the hexagonal grid overlaid on top of a rectangular grid.

As shown in FIG. 3, a rectangular grid 200 can be computed that includes rectangular cells 220 having a width that corresponds to a distance between a vertex and a center point 139 and/or a side and a center point 139 of a hexagon cell 102. The height of the rectangular cells 220 can correspond to the Y-difference between two center points of two adjacent hexagonal cells, as also shown in FIG. 3. For example, if a desired number of hexagonal cells in an X-direction is given as xHex, then the rectangular cell width can be computed using the following Equation 1:

$$\text{width} = W/(2 \ast xHex - 1) \qquad \text{Equation 1:}$$

In some implementations, the rectangular cell height can be computed using the following Equation 2:

$$\text{height} = (\text{width}) \ast \text{sqrt}(3) \qquad \text{Equation 2:}$$

In some implementations, the number of hexagonal cell rows can be computed using the following Equation 3:

$$\text{rows} = \text{ceil}(H/ch + \tfrac{2}{3}) \qquad \text{Equation 3:}$$

If a desired number of hexagon cells 102 in a Y-direction is given, the X and Y coordinates can be swapped. If the hexagon cell size is specified by area (A), the rectangular cell width can be determined using the following Equation 4:

$$\text{width} = \text{sqrt}(A)/(\text{sqrt}(2\text{sqrt}(3))). \qquad \text{Equation 4:}$$

Furthermore, Equations 1-4 can assist with determining which hexagon cell of the hexagon grid a data point is positioned within. For example, by referencing the first hexagonal cell 110, any data point within the hexagonal grid (such as shown in FIG. 1) can be determined to be within a hexagonal cell of the hexagonal grid. As discussed above, each hexagonal cell can be assigned a reference identifier (e.g., a number, etc.) such that the determined hexagonal cell containing the data point can be referenced by such identifier.

FIG. 3 illustrates an example of the hexagonal grid 100 overlaid on top of a rectangular grid 200. For example, two rows of five horizontally aligned hexagonal cells 102 (e.g., tips of the hexagonal cells pointing upwards and downwards) can cover all of the data points 106 plotted in the rectangular grid 200. For each hexagonal cell 102, the hexagonal cell identifier 150 can be assigned and provided.

In some implementations, two coordinates associated with a data point 106 can allow a system to determine a rectangular cell 220, as well as a hexagonal cell 102, that the data point 106 is positioned inside. For example, each rectangular cell 220 can include parts of two neighboring hexagonal cells 102, as also shown in FIG. 3. Furthermore, each rectangular cell 220 can be divided by a side of a hexagonal cell 102, such as a lower left side 130, as shown in FIG. 3. For example, if the data point 106 is located above the side dividing the rectangular cell 220, then the data point 106 is considered to be contained within a hexagonal cell 102 positioned above the side dividing the rectangular cell 220. However, if the data point 106 is located below the side dividing the rectangular cell 220, then the data point 106 is considered to be contained within a hexagonal cell 102 positioned below the side dividing the rectangular cell 220.

In some embodiments, the hexagon vertices can be defined or determined based on the bounding box and grid size. Additionally, at least some computed hexagon vertex coordinates are rounded to a whole number. As such, only coordinates for the lower left vertices 132 may be computed for any given hexagonal cell 102. For example, any upper right vertex 137 of a first hexagonal cell can be a lower left vertex 132 of an adjacent hexagonal cell. As such, the adjacent hexagonal cell can be referenced to determine coordinates for the respective lower left vertex 132 of such adjacent hexagonal cell. Furthermore, this can be the case even when the adjacent hexagonal cell is not within the bounding box, thereby allowing coordinates of any vertex in an entire hexagonal grid to be computed using the same arithmetic expression and thus getting the same rounded IEEE 754 double-precision floating-point coordinate. This can ensure that no two hexagonal cells within a hexagonal grid overlap, as well as ensure that a gap is not present between any two adjacent hexagonal cells.

FIG. 4 illustrates an example programming code corresponding to hexagonal grid clustering, such as when used with SAP HANA, and consistent with the subject matter disclosed herein.

Figure 5:
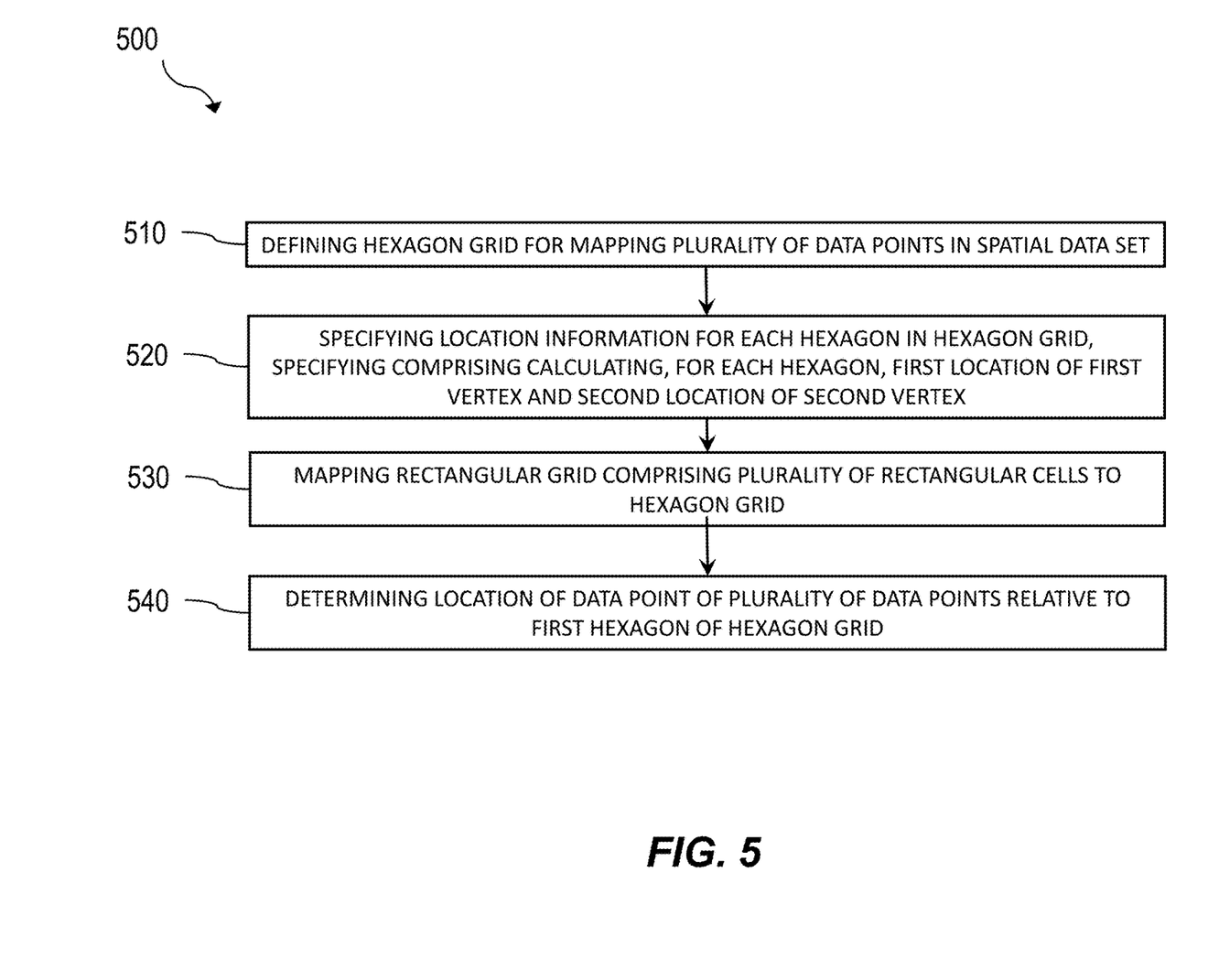
FIG. 5 is a diagram illustrating a system including a data storage application.

FIG. 5 is a process flow diagram illustrating an exemplary method 500 of the subject matter disclosed herein. In various implementations, the method 500 may be performed by a system comprising at least one hardware data processor and at least one memory storing instructions which, when executed by the at least one data processor, can result in operations comprising at least the method 500 illustrated in FIG. 5. Although illustrated in linear fashion, in various implementations, the steps of the method 500 may be executed in a different order, and not all of the steps of method 500 may be required or executed.

At operational block 510, a hexagon grid can be defined for mapping a plurality of data points in a spatial data set. At operational block 520, location information can be specified for each hexagon in the hexagon grid. The specifying can include calculating, for each hexagon, a first location of a first vertex and a second location of a second vertex. At operational block 530, a rectangular grid including a plurality of rectangular cells can be mapped to the hexagon grid.

At operational block 540, a location of a data point of the plurality of data points can be determined relative to a first hexagon of the hexagon grid. In some implementations, the location of the data point relative to the first hexagon can be determined by comparing a position of the data point relative to a first rectangular cell of the plurality of rectangular cells. The first rectangular cell can surround the data point and include a line extending between the first vertex and the second vertex of the first rectangular cell.

In some implementations, the location of the data point relative to the first hexagon can be determined by determining the data point is positioned at one of two first vertices of the first hexagon. The first vertices can map the data point as being included in the first hexagon.

In some implementations, the location of the data point relative to the first hexagon can be determined by determining the data point is positioned at one of four second vertices of the first hexagon. The second vertices can map the data point as being outside of or not included within the first hexagon.

In some implementations, the location of the data point relative to the first hexagon can be determined by determining the data point is positioned along one of three first sides of the first hexagon. The first sides can map the data point as being included in the first hexagon.

In some implementations, the location of the data point relative to the first hexagon can be determined by determining the data point is positioned along one of three second sides of the first hexagon. The second sides can map the data point as being outside of the first hexagon.

In some implementations, the method 500 can further include determining all vertices for a selected hexagon in the hexagon grid. The determining of all the vertices can include calculating the first location of the first vertex and the second location of the second vertex for the selected hexagon based on information for the selected hexagon. Furthermore, the determining of all the vertices can also include calculating locations of the remaining vertices of the selected hexagon based on information for at least one neighboring hexagon that is adjacent to the selected hexagon. The neighboring hexagon can share one of the remaining vertices of the selected hexagon.

Figure 6:
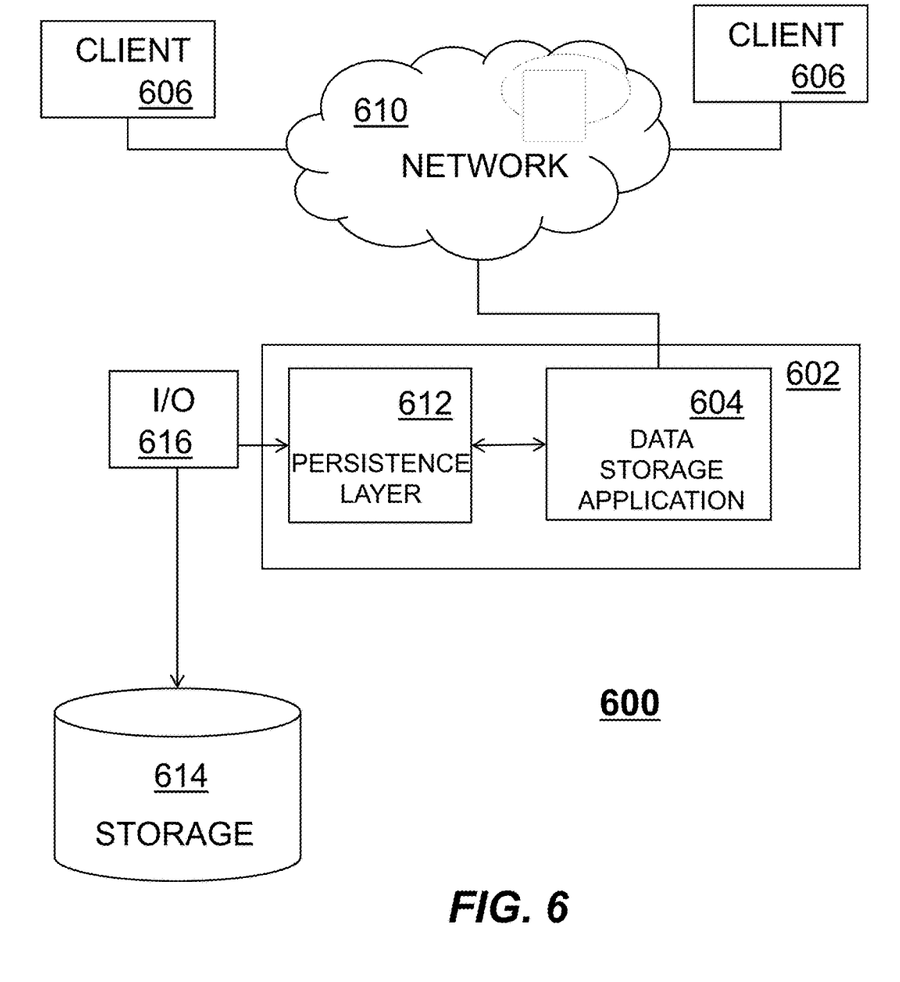
FIG. 6 is a diagram of a system that can implement one or more features consistent with the current subject matter.

FIG. 6 shows an example of a system 600 in which a computing system 602, which can include one or more programmable processors that can be collocated, linked over one or more networks, etc., executes one or more modules, software components, or the like of a data storage application 604. The data storage application 604 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 602 as well as to remote users accessing the computing system 602 from one or more client machines 606 over a network connection 610. One or more user interface screens produced by the one or more first modules can be displayed to a user, either via a local display or via a display associated with one of the client machines 606. Data units of the data storage application 604 can be transiently stored in a persistence layer 612 (e.g. a page buffer or other type of temporary persistency layer), which can write the data, in the form of storage pages, to one or more storages 614, for example via an input/output component 616. The one or more storages 614 can include one or more physical storage media or devices (e.g. hard disk drives, persistent flash memory, random access memory, optical media, magnetic media, and the like) configured for writing data for longer term storage. It should be noted that the storage 614 and the input/output component 616 can be included in the computing system 602 despite their being shown as external to the computing system 602 in FIG. 6.

Data retained at the longer term storage 614 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Without in any way limiting the scope, interpretation, or application of the claims appearing below, a technical effect of one or more of the example embodiments disclosed herein is more efficient execution of complex calculation scenarios while allowing a developer to develop less complex software. For example, new software for databases may be deployed on top of currently existing software while still maintaining some of the benefits of the existing software and gaining additional benefits from the new software.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one hardware data processor; and
   at least one memory storing instructions which, when executed by the at least one data processor, result in operations comprising:
   defining a hexagon grid for mapping a plurality of data points in a spatial data set;
   specifying location information for each hexagon in the hexagon grid, the specifying comprising calculating, for each hexagon, a first location of a first vertex and a second location of a second vertex;
   mapping a rectangular grid comprising a plurality of rectangular cells to the hexagon grid; and
   determining a location of a data point of the plurality of data points relative to a first hexagon of the hexagon grid,
   wherein in response to the data point positioned along one of three first sides of the first hexagon, the three first sides mapping the data point as being clustered within the first hexagon, and
   wherein in response to the data point positioned along one of three second sides of the first hexagon, the three second sides mapping the data point as being clustered outside of the first hexagon.

2. The system of claim 1, wherein the determining the location of the data point relative to the first hexagon comprises comparing a position of the data point relative to a first rectangular cell of the plurality of rectangular cells, the first rectangular cell surrounding the data point and including a line extending between the first vertex and the second vertex of the first rectangular cell.

3. The system of claim 1, wherein the determining the location of the data point relative to the first hexagon comprises determining the data point is positioned at one of two first vertices of the first hexagon, the first vertices mapping the data point as being included in the first hexagon.

4. The system of claim 3, wherein the determining the location of the data point relative to the first hexagon comprises determining the data point is positioned at one of four second vertices of the first hexagon, the second vertices mapping the data point as being outside of the first hexagon.

5. The system of claim 1, further comprising determining all vertices for a selected hexagon in the hexagon grid, the determining of all vertices comprising:
   calculating the first location of the first vertex and the second location of the second vertex for the selected hexagon based on information for the selected hexagon; and
   calculating locations of the remaining vertices of the selected hexagon based on information for at least one neighboring hexagon that is adjacent to the selected hexagon, the neighboring hexagon sharing one of the remaining vertices of the selected hexagon.

6. A computer-implemented method, comprising:
   defining a hexagon grid for mapping a plurality of data points in a spatial data set;
   specifying location information for each hexagon in the hexagon grid, the specifying comprising calculating, for each hexagon, a first location of a first vertex and a second location of a second vertex;

mapping a rectangular grid comprising a plurality of rectangular cells to the hexagon grid; and determining a location of a data point of the plurality of data points relative to a first hexagon of the hexagon grid, wherein in response to the data point positioned along one of three first sides of the first hexagon, the three first sides mapping the data point as being clustered within the first hexagon, and wherein in response to the data point positioned along one of three second sides of the first hexagon, the three second sides mapping the data point as being clustered outside of the first hexagon.

7. The method of claim 6, wherein the determining the location of the data point relative to the first hexagon comprises comparing a position of the data point relative to a first rectangular cell of the plurality of rectangular cells, the first rectangular cell surrounding the data point and including a line extending between the first vertex and the second vertex of the first rectangular cell.

8. The method of claim 6, wherein the determining the location of the data point relative to the first hexagon comprises determining the data point is positioned at one of two first vertices of the first hexagon, the first vertices mapping the data point as being included in the first hexagon.

9. The method of claim 8, wherein the determining the location of the data point relative to the first hexagon comprises determining the data point is positioned at one of four second vertices of the first hexagon, the second vertices mapping the data point as being outside of the first hexagon.

10. The method of claim 6, further comprising determining all vertices for a selected hexagon in the hexagon grid, the determining of all vertices comprising:

calculating the first location of the first vertex and the second location of the second vertex for the selected hexagon based on information for the selected hexagon; and calculating locations of the remaining vertices of the selected hexagon based on information for at least one neighboring hexagon that is adjacent to the selected hexagon, the neighboring hexagon sharing one of the remaining vertices of the selected hexagon.

11. A non-transitory computer-readable medium storing instructions, which when executed by at least one data processor, result in operations comprising:

defining a hexagon grid for mapping a plurality of data points in a spatial data set;

specifying location information for each hexagon in the hexagon grid, the specifying comprising calculating, for each hexagon, a first location of a first vertex and a second location of a second vertex;

mapping a rectangular grid comprising a plurality of rectangular cells to the hexagon grid; and determining a location of a data point of the plurality of data points relative to a first hexagon of the hexagon grid, wherein in response to the data point positioned along one of three first sides of the first hexagon, the three first sides mapping the data point as being clustered within the first hexagon, and wherein in response to the data point positioned along one of three second sides of the first hexagon, the three second sides mapping the data point as being clustered outside of the first hexagon.

12. The non-transitory computer-readable medium of claim 11, wherein the determining the location of the data point relative to the first hexagon comprises comparing a position of the data point relative to a first rectangular cell of the plurality of rectangular cells, the first rectangular cell surrounding the data point and including a line extending between the first vertex and the second vertex of the first rectangular cell.

13. The non-transitory computer-readable medium of claim 11, wherein the determining the location of the data point relative to the first hexagon comprises determining the data point is positioned at one of two first vertices of the first hexagon, the first vertices mapping the data point as being included in the first hexagon.

14. The non-transitory computer-readable medium of claim 13, wherein the determining the location of the data point relative to the first hexagon comprises determining the data point is positioned at one of four second vertices of the first hexagon, the second vertices mapping the data point as being outside of the first hexagon.

\* \* \* \* \*